US006615223B1

United States Patent
Shih et al.

(10) Patent No.: US 6,615,223 B1
(45) Date of Patent: Sep. 2, 2003

(54) METHOD AND SYSTEM FOR DATA REPLICATION

(75) Inventors: Kuang-Yu Shih, San Jose, CA (US); Uppili Srinivasan, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/515,680

(22) Filed: Feb. 29, 2000

(51) Int. Cl.[7] .......................... G06F 12/00; G06F 17/30
(52) U.S. Cl. ....................... 707/201; 707/204; 707/203
(58) Field of Search ................... 707/10, 203, 204, 707/202, 101; 709/201, 101

(56) References Cited

U.S. PATENT DOCUMENTS

| | | | |
|---|---|---|---|
| 4,714,995 A | * 12/1987 | Materna et al. ............. 707/201 |
| 5,295,256 A | 3/1994 | Bapat ......................... 717/137 |
| 5,442,780 A | 8/1995 | Takanashi et al. ............. 707/1 |
| 5,454,106 A | 9/1995 | Burns et al. ..................... 707/4 |
| 5,471,613 A | 11/1995 | Banning et al. ................ 707/4 |
| 5,499,371 A | 3/1996 | Henninger et al. .......... 717/108 |
| 5,615,362 A | 3/1997 | Jensen et al. ............ 707/103 R |
| 5,664,173 A | 9/1997 | Fast ............................... 707/4 |
| 5,706,506 A | 1/1998 | Jensen et al. ............ 707/103 R |
| 5,799,306 A | * 8/1998 | Sun et al. ...................... 707/10 |
| 5,806,074 A | * 9/1998 | Souder et al. ............... 707/201 |
| 5,809,502 A | 9/1998 | Burrows ......................... 707/7 |
| 5,884,324 A | * 3/1999 | Cheng et al. ................ 707/201 |
| 5,937,409 A | 8/1999 | Wetherbee ............. 707/103 R |
| 5,937,414 A | * 8/1999 | Souder et al. ............... 707/203 |
| 5,963,932 A | 10/1999 | Jakobsson et al. ............. 707/2 |
| 5,995,999 A | 11/1999 | Bharadhwaj ................ 709/200 |
| 6,009,422 A | 12/1999 | Ciccarelli ....................... 707/4 |
| 6,012,067 A | 1/2000 | Sarkar .................... 707/103 R |
| 6,016,499 A | 1/2000 | Ferguson ................ 707/104.1 |
| 6,029,178 A | * 2/2000 | Martin et al. ............... 707/201 |
| 6,047,284 A | 4/2000 | Owens et al. .................... 707/4 |
| 6,052,681 A | 4/2000 | Harvey ........................... 707/3 |
| 6,058,401 A | * 5/2000 | Stamos et al. .............. 707/201 |
| 6,078,925 A | 6/2000 | Anderson et al. ....... 707/103 R |
| 6,085,188 A | 7/2000 | Bachmann et al. ............. 707/3 |
| 6,122,258 A | 9/2000 | Brown ........................ 370/256 |
| 6,122,630 A | * 9/2000 | Strickler et al. ............... 707/8 |
| 6,131,098 A | 10/2000 | Zellweger ................... 707/102 |
| 6,134,559 A | 10/2000 | Brumme et al. ........ 707/103 R |
| 6,154,743 A | 11/2000 | Leung et al. .................. 707/10 |
| 6,163,776 A | 12/2000 | Periwal ........................... 707/4 |
| 6,178,416 B1 | 1/2001 | Thompson et al. ............. 707/3 |
| 6,189,000 B1 | 2/2001 | Gwertzman et al. ........... 707/1 |
| 6,199,062 B1 | 3/2001 | Byrne et al. .................... 707/3 |
| 6,301,589 B1 | * 10/2001 | Hirashima et al. .......... 707/204 |
| 6,338,092 B1 | * 1/2002 | Chao et al. ................. 709/236 |
| 6,356,913 B1 | * 3/2002 | Chu et al. ............... 707/103 R |
| 6,412,017 B1 | * 6/2002 | Straube et al. .............. 709/313 |
| 6,453,310 B1 | * 9/2002 | Zander ........................... 707/1 |

OTHER PUBLICATIONS

Microsoft Computer Dictionary, Microsoft Press, Third Edition, p.292.*

Innosoft International, Inc., "LDAP FAQ", Jun. 1997, pp. 1–7; http://www.critical–angle.com/ldapworld/dapfaq.html.

(List continued on next page.)

*Primary Examiner*—Greta Robinson
*Assistant Examiner*—Susan Rayyan
(74) *Attorney, Agent, or Firm*—Bingham McCutchen LLP

(57) ABSTRACT

A method and mechanism for data replication is disclosed. One embodiment of the invention relates to an efficient and effective replication system using LDAP replication components. Another embodiment of the invention pertains to a schema and format independent method for data replication. Procedures for adding, deleting, and modifying replicated data, and for replicating conflict resolution are also disclosed. A further embodiment of the invention is directed to improved methods and mechanisms for adding and removing nodes from a replication system.

38 Claims, 11 Drawing Sheets

OTHER PUBLICATIONS

W. Yeong et al., "*Lightweight Directory Access Protocol*", Mar. 1995, pp. 1–20; http://www.umich.edu/~dirsvcs/ldap/doc/rfc/rfc1777.txt.

T. Howes, "*A String Representation of LDAP Search Filters*", Dec. 1993, pp. 1–3; http://www.umich.edu/~dirsvcs/ldap/doc/rfc/rfc1558.txt.

T. Howes et al., "*The String Representation of Standard Attribute Syntaxes*", Mar. 1995, pp. 1–11; http://www.umich.edu/~dirsvcs/ldap/doc/rfc/rfc1778.txt.

S. Kille, "*A String Representation of Distinguished Names*", Mar. 1995, pp. 1–8; http://www.umich.edu/~dirsvcs/ldap/doc/rfc/rfc1779.txt.

A. Young, "*Connection–less Lightweight Directory Access Protocol*", Jun. 1995, pp. 1–8; http://www.umich.edu/~dirsvcs/ldap/doc/rfc/rfc1798.txt.

T. Howes et al., "*The LDAP Application Program Interface*", Aug. 1995, pp. 1–20; http://www.umich.edu/~dirsvcs/ldap/doc/rfc/rfc1823.txt.

T. Howes et al., "*An LDAP URL Format*", Jun. 1996, pp. 1–4; http://www.umich.edu/~dirsvcs/ldap/doc/rfc/rfc1959.html.

ldap.support@umich.edu, "*Referrals Within the LDAPv2 Protocol*", Aug. 1996, pp. 1–4; http://www.umich.edu/~dirsvcs/ldap/doc/other/ldap–ref.html.

Innosoft International, Inc., "*Lightweight Directory Access Protocol (Version 3) Specifications*", Dec. 1998, pp. 1–3; http://www.critical–angle.com/ldapworld/ldapv3.html.

T.A. Howes et al., "*A Scalable, Deployable, Directory Service Framework for the Internet*", Aug. 1995, pp. 1–2; http://info.isoc.org/HMP/PAPER/173/abst.html.

EIN–DOR, Phillip et al., "*Natural Language Access to Multiple Databases: A Model and a Prototype*", Journal of Management Information Systems, Summer 1995, vol. 12, No. 1, pp. 171–197.

Ozsoyoglu, Gultekin et al., "*Query Processing Techniques in the Summary–Table–by–Example Database Query Language*", ACM Transactions on Database Systems, vol. 14, No. 4, Dec. 1989, pp. 526–573.

\* cited by examiner

ATTRIBUTE STORE TABLE                                                   ⟵400

| EID | AttrName | AttrVal | AttrKind |
|---|---|---|---|
| 96 | Org. Name | Oracle | User |
| 97 | Dept. Name | Administration | User |
| 97 | State | CA | User |
| 98 | Dept. Name | Sales | User |
| 98 | State | NY | User |
| 99 | Dept. Name | R & D | User |
| 99 | State | CA | User |
| 100 | First Name | John | User |
| 100 | Last Name | Doe | User |
| 100 | Tel. No. | 555-1111 | User |
| 100 | Manager | Larry Founder | User |
| 100 | State | CA | User |
| 101 | First Name | Jim | User |
| 101 | Last Name | Smith | User |
| 101 | Tel. No. | 555-2222 | User |
| 101 | Manager | John Doe | User |
| 101 | State | NY | User |
| 102 | First Name | Joe | User |
| 102 | Last Name | Jones | User |
| 102 | Tel. No. | 555-3333 | User |
| 102 | Manager | Jim Smith | User |
| 102 | State | CA | User |
| 103 | First Name | Larry | User |
| 103 | Last Name | Founder | User |
| 103 | Tel. No. | 555-4444 | User |
| 103 | State | CA | User |
| 100 | Modification Timestamp | 01/01/97 | Operational |
| 101 | Modification Timestamp | 07/01/97 | Operational |
| 102 | Modification Timestamp | 07/30/98 | Operational |
| 103 | Modification Timestamp | 01/01/98 | Operational |

*FIG. 4*

PERSON CLASS TABLE

806

| ENTRY NO. | LAST NAME | FIRST NAME | TEL. NO. | STATE | MANAGER |
|---|---|---|---|---|---|
| 100 | Doe | John | 555-1111 | CA | Larry Founder |
| 101 | Smith | Jim | 555-2222 | NY | John Doe |
| 102 | Jones | Joe | 555-3333 | CA | Jim Smith |
| 103 | Founder | Larry | 555-4444 | CA | |
| 104 | Last | Bob | 555-5555 | CA | Jim Smith |

METHOD AND SYSTEM FOR DATA REPLICATION

BACKGROUND OF THE INVENTION

1. Field of the Invention

The invention relates to the replication of data in a database system.

2. Background

Data replication is the process of maintaining multiple copies of a database object in a distributed database system. Performance improvements can be achieved when data replication is employed, since multiple access locations exist for the access and modification of the replicated data. For example, if multiple copies of a data object are maintained, an application can access the logically "closest" copy of the data object to improve access times and minimize network traffic. In addition, data replication provides greater fault tolerance in the event of a server failure, since the multiple copies of the data object effectively become online backup copies if a failure occurs.

In general, there are two types of propagation methodologies for data replication, referred to as "synchronous" and "asynchronous" replication. Synchronous replication is the propagation of changes to all replicas of a data object within the same transaction as the original change to a copy of that data object. For example, if a change is made to a table at a first replication site by a Transaction A, that change must be replicated to the corresponding tables at all other replication sites before the completion and commitment of Transaction A. Thus, synchronous replication can be considered real-time data replication. In contrast, asynchronous replication can be considered "store-and-forward" data replication, in which changes made to a copy of a data object can be propagated to other replicas of that data object at a later time. The change to the replicas of the modified data object does not have to be performed within the same transaction as the original calling transaction.

Synchronous replication typically results more overhead than asynchronous replication. More time is required to perform synchronous replication since a transaction cannot complete until all replication sites have finished performing the requested changes to the replicated data object. Moreover, a replication system that uses real-time propagation of replication data is highly dependent upon system and network availability, and mechanisms must be in place to ensure this availability. Thus, asynchronous replication is more generally favored for noncritical data replication activities. Synchronous replication is normally employed only when application requires that replicated sites remains continuously synchronized.

One approach to data replication involves the exact duplication of database schemas and data objects across all participating nodes in the replication environment. If this approach is used in a relational database system, each participating site in the replication environment has the same schema organization for the replicated database tables and database objects that it maintains. If a change is made to one replica of a database table, that same change is propagated to all corresponding database tables to maintain the consistency of the replicated data. Since the same schema organization used the replicated data across all replication sites, the instructions used to implement the changes at all sites can be identical.

Generally, two types of change instructions have been employed in data replication systems. One approach involves the propagation of changed data values to each replication site. Under this approach, the new value for particular data objects are propagated to the remote replication sites. The corresponding data objects at the remote sites are thereafter replaced with the new values. A second approach is to use procedural replication. Under this approach, a database query language statement, e.g., a database statement in the Structured Query Language ("SQL"), is propagated instead of actual data values. The database statement is executed at the remote sites to replicate the changes to the data at the remote replication sites. Since all replication sites typically have the same schema organization and data objects, the same database statement can be used at both the original and remote sites to replicate any changes to the data.

A significant drawback to these replication approaches is that they cannot be employed in a heterogeneous environment in which the remote replication sites have different, and possibly unknown, schema organizations for the replicated data. For example, consider if information located in a single database table at a first replication site is stored within two separate tables at a second replication site. The approach of only propagating changed values for a data object to a remote replication site presents great difficulties, since the data object to be changed at the first replication site may not exist in the same form at the second replication site (e.g., because the data object exists as two separate data items at the second replication site). Using procedural replication results in similar problems. Since each replication site may have a different schema organization for its data, a different database statement may have to be specifically written to make the required changes at the remote sites. Moreover, if the schema organization of the remote site is unknown, it is impossible to properly formulate a database statement to replicate the intended changes at the remote site.

Another drawback to these approaches in which database schema and objects are exactly duplicated across the replication environment is that they require greater use of synchronous replication. If a schema change is made to a database table at one site, then that change must be synchronously propagated to all other sites. This is because the basic structure of the table itself is being changed. Any further changes to that database table without first synchronously changing the underlying schema for that table could result in conflicts to the data. Moreover, synchronous replication of the schema changes could require that the replication environment be quieced during the schema change, affecting the availability of the system.

One type of database application for which data replication is particularly useful is the replication of data for directory information systems. Directory information systems provide a framework for the storage and retrieval of information that are used to identify and locate the details of individuals and organizations, such as telephone numbers, postal addresses, and email addresses.

One common directory system is a directory based on the Lightweight Directory Access Protocol ("LDAP"). LDAP is an object-oriented directory protocol that was developed at the University of Michigan, originally as a front end to access directory systems organized under the X.500 standard for open electronic directories (which was originally promulgated by the Comite Consultantif International de Telephone et Telegraphe "CCITT" in 1988). Standalone LDAP server implementations are now commonly available to store and maintain directory information. Further details of the LDAP directory protocol can be located at the LDAP-devoted website maintained by the University of Michigan at http://www.umich.edu/~dirsvcs/ldap/doc/, including the following documents (which are hereby incorporated by reference in their entirety): RFC-1777 Lightweight Directory Access Protocol; RFC-1558 A String Representation of LDAP Search Filters; RFC-1778 The String Representation of Standard Attribute Syntaxes; RFC-1779 A String Representation of Distinguished Names; RFC-1798 Connectionless LDAP; RFC-1823 The LDAP Application Program Interface; and RFC-1959 An LDAP URL Format.

LDAP directory systems are normally organized in a hierarchical structure having entries organized in the form of a tree, which is referred to as a directory information tree ("DIT"). The DIT is often organized to reflect political, geographic, or organizational boundaries. A unique name or ID (which is commonly called a "distinguished name") identifies each LDAP entry in the DIT. An LDAP entry is a collection of one or more entry attributes. Each entry attribute has a "type" and one or more "values." Each entry belongs to a particular object class. Entries that are members of the same object class share a common composition of possible entry attribute types.

There are significant drawbacks to existing systems for performing replication of LDAP entries, objects, and attributes. Many conventional replication systems used for LDAP replication do not have robust procedures for adding or deleting replication nodes. For example, the addition or deletion of replication nodes in a conventional LDAP system often results in system downtime to implement configuration changes. Moreover, many existing systems for LDAP replication do not have robust procedures for adding, deleting, or modifying replicated data or handling replication conflicts.

Therefore, there is a need for an improved method and system for replicating data in a database system. There is further the need for a robust and efficient replication system for performing LDAP replication.

SUMMARY OF THE INVENTION

The present invention is directed to methods and mechanisms for data replication. According to an aspect of the invention, an efficient and effective replication system is disclosed using LDAP replication components. Another aspect of the invention pertains to a schema and format independent method and method for data replication. Yet another aspect of the invention relates to procedures for adding, deleting, and modifying replicated data and for replication conflict resolution. Another aspect of the invention relates to improved methods and mechanisms for adding and removing nodes from a replication system.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the detailed Description of Embodiment(s), serve to explain the principles of the invention.

FIG. 4 shows an alternate approach for storing LDAP data in database tables.

FIG. 8 depicts a revised version of the table shown in FIG. 2C.

DETAILED DESCRIPTION

The present invention is directed to a method and mechanism for replication in a database system that does not depend upon the same schema or data organizations being maintained at each replication site. The present invention is particularly well suited for LDAP data replication. According to one aspect of the invention, any data changes at a first replication site are replicated to other replication sites using schema and system independent change records. The change records are created in a standard format that is usable by all other replication sites in the system. Once the change record has been propagated to each remote replication site, the change record is then utilized to implement database instructions that are appropriate for the specific schema and system parameters of the remote site.

Figure 1:
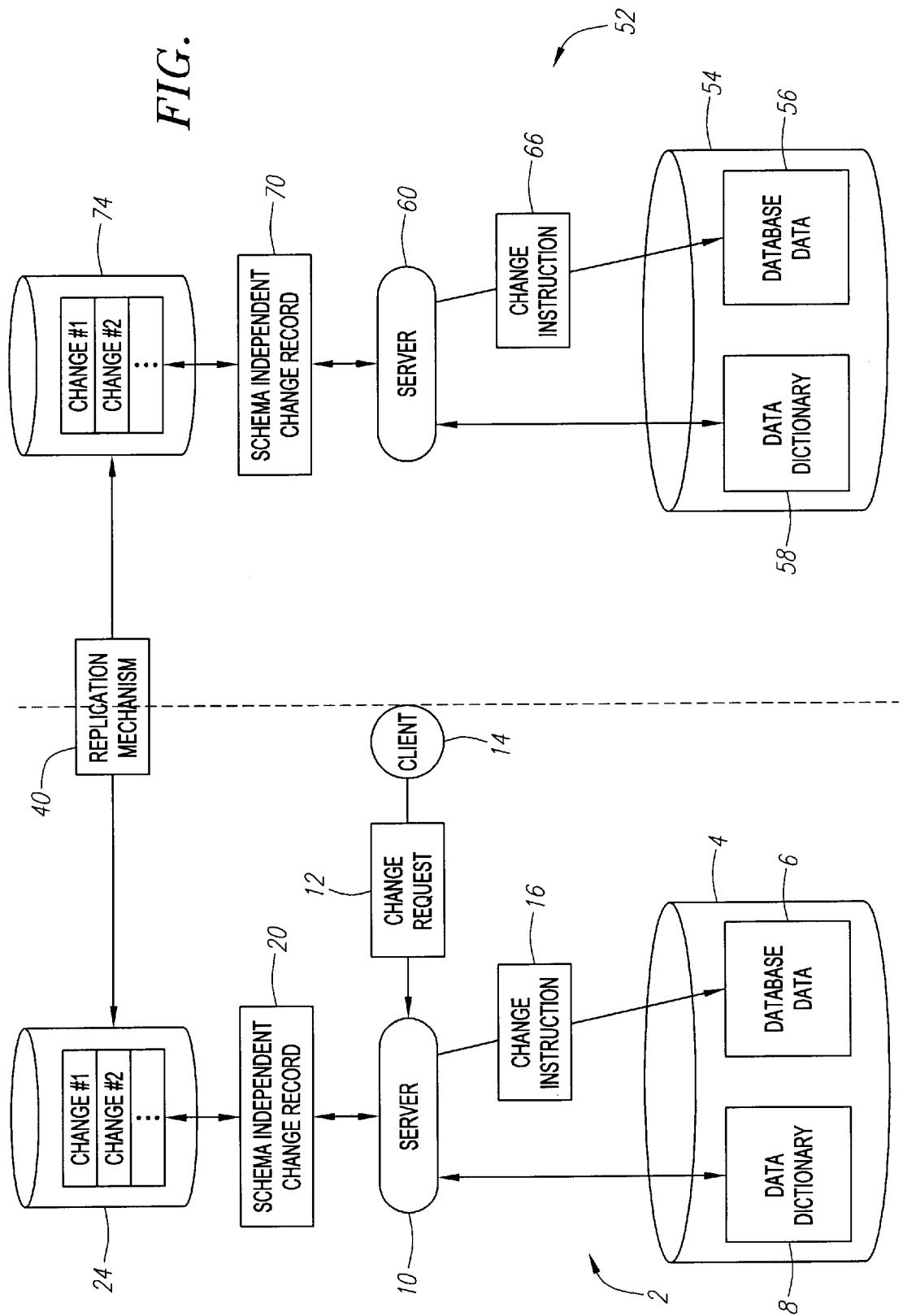
FIG. 1 depicts a system architecture for data replication according to an embodiment of the invention.

FIG. 1 depicts a system architecture for performing data replication according to an embodiment of the invention. Note that FIG. 1 illustrates the invention with reference to two replication sites; however, the inventive principles described herein is equally applicable to systems having more than two replication sites.

A first replication site 2 includes a database 4 having database data 6 and a data dictionary 8. Data dictionary 8 contains metadata that describes the schema and data organizations of database 4. First replication site 2 includes a server 10 that is responsible for accessing and modifying the database data 6 in database 4. Any client 14 that seeks to modify the database data 6 sends a request 12 to server 10 to add, change, or delete data. In response to request 12, change instructions 16 are issued to modify the database data 6.

A second replication site 52 similarly includes a database 54 having database data 56 and a data dictionary 58. Second replication site 52 further includes a server 60 that is responsible for accessing and modifying the database data 56 in database 54. If changes are to be made to database data 56, server 60 issues change instructions 66 to implement the requested changes.

For the purposes of illustration, assume that the system of FIG. 1 is used in a "peer-to-peer" or "multi-master" replication environment. In many peer-to-peer or multi-master replication environments, data changes made at a replication site are propagated to other replication sites, without the need for an overall "master" replication site. Thus, if a change request 12 at first replication site 2 is implemented to database data 6, that same change is replicated to the database data 56 at second replication site 52. Likewise, if a change request is made to second replication site 52 that is implemented to database data 56, that same change is replicated to the database data 6 at first replication site 2.

When a change request 12 is received at first replication site 2, server 10 issues change instruction 16 to implement the change request 12. The change instruction 16 takes into account the exact schema organization of the data object to be changed. Thus, the change instruction is schema-specific, and in a heterogeneous environment cannot simply be sent to all remote replication sites to replicate the data change, since the schema and/or system configuration of the remote replication sites may be entirely different than the schema and system configuration of local replication site 2.

According to the invention, server 10 translates either change instruction 16 or change request 12 into a schema and system independent change record 20. Change record is in a generic format that is consistent and recognizable across all replication sites in the system. In the normal contemplated usage of the invention, change record 20 comprises change information that is focussed upon the specific data to be added, deleted, or modified by the change request 12, and does not contain information regarding the schema organization of the data at the originating replication site.

The change record 20 is added to a change record table 24 at first replication site 2. According to an embodiment, it is the contents of the change record table 24 that is actually replicated to other replication sites. Thus, the contents of change record table 24 is replicated to the change record table 74 of second replication site 52. The change record 70, which is the replicated version of change record 20, is retrieved by server 60 to be applied to database data 56. Server 60 analyzes change record 70 to determine what data items are being changed. Based upon information located in the data dictionary 58, server 60 translates change record 70 into change instructions 66 that is specific to the schema and system configuration of database 54. The change instruction 66 is applied to replicate the change at replication site 52.

Since the change records are created in a format that is independent of schema or system configuration for the replication sites, true peer-to-peer replication is achieved in a heterogeneous environment, regardless of the schema, data, or system configurations of the database systems taking part in the replication environment.

ILLUSTRATIVE EXAMPLE

The present illustrative example is directed to an LDAP information system, which is used to provide a framework for the storage and retrieval of information that are used to identify and locate the details of individuals and organizations, such as telephone numbers, postal addresses, and email addresses. Recall from above that LDAP directory systems are normally organized in a hierarchical structure having entries organized in the form of a tree, which is referred to as a directory information tree ("DIT"). The DIT is often organized to reflect political, geographic, or organizational boundaries. A unique name or ID (which is commonly called a "distinguished name") identifies each LDAP entry in the DIT. An LDAP entry is a collection of one or more entry attributes. Each entry attribute has a "type" and one or more "values." Each entry belongs to a particular object class. Entries that are members of the same object class share a common composition of possible entry attribute types.

Figure 5:
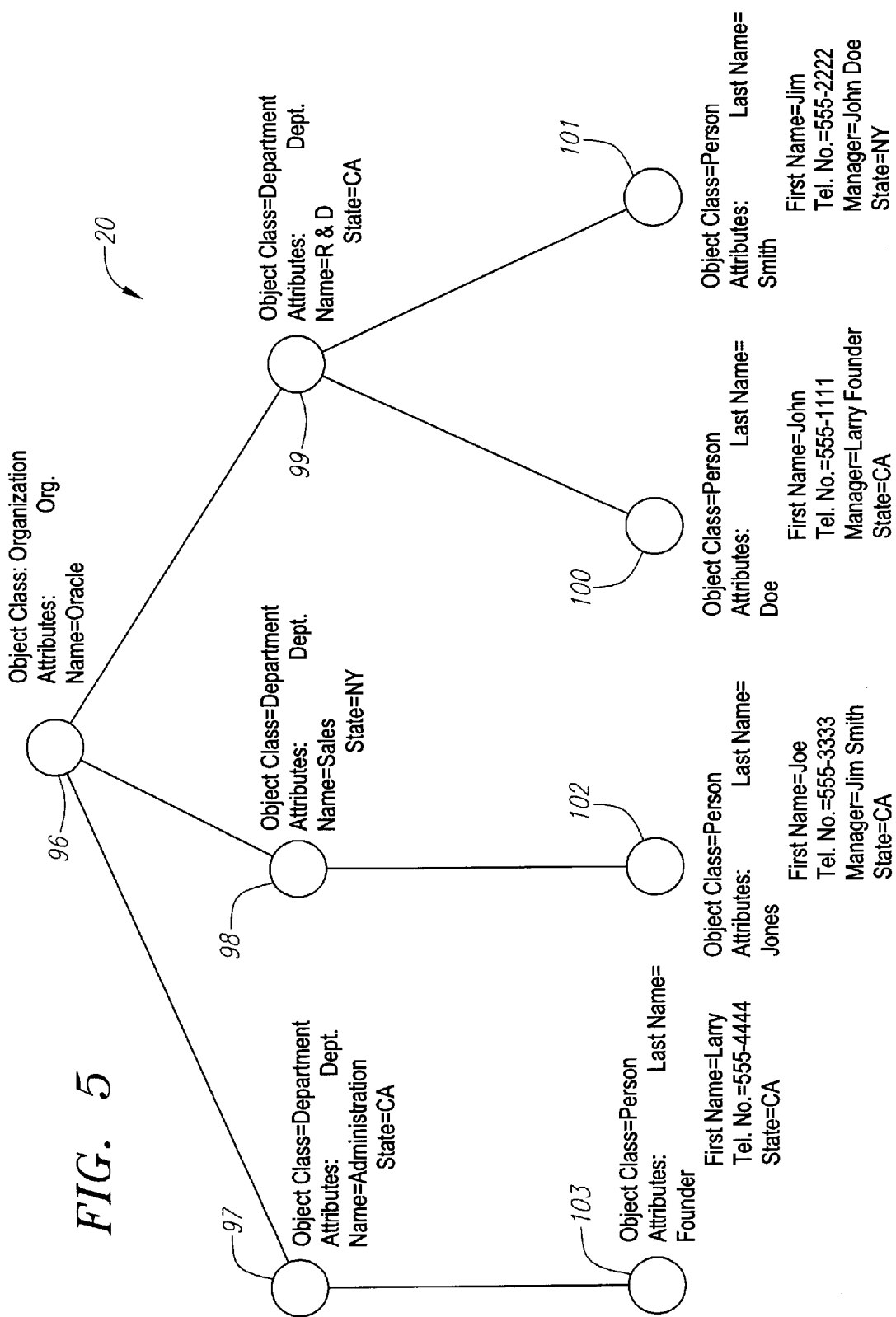
FIG. 5 illustrates an example of a directory information tree.

Referring to FIG. 5, shown is an example of a hierarchical tree of directory entities. Entry 96 is the top most level of DIT 20 and is of object class "organization" having an attribute type "Org. Name" with an attribute value of "Oracle". Entry 96 is the "parent" entry for three "child" entries (97, 98, and 99) directly beneath it in DIT 20. Entries 97, 98, and 99 are objects of object class "Department" each having attributes "Dept. Name" and "State." Entry 97 has an attribute type "Dept. Name" having a value of "Administration" and an attribute type "State" with the value "CA". Entry 98 has an attribute "Dept. Name" with the value "Sales" and an attribute type "State" with an attribute value "NY". Entry 99 has an attribute type "Dept. Name" with an attribute value "R&D" and an attribute type "State" with a value of "CA".

Entry 103 is a child entry of entry 97. Entry 103 represents an object of class "Person" having the following attribute type-value pairs: (1) attribute type "Last Name" with a value of "Founder"; (2) attribute type "First Name" with a value of "Larry"; (3) attribute type "Tel. No." with a value of "555-4444"; and (4) attribute type "State" with a value of "CA".

Entry 102 is a child entry of entry 98. Entry 102 represents an object of class "Person" having the following attribute type-value pairs: (1) attribute type "Last Name" with a value of "Jones"; (2) attribute type "First Name" with a value of "Joe"; (3) attribute type "Tel. No." with a value of "555-3333"; (4) attribute type "Manager" having the value of "Jim Smith"; and (5) attribute type "State" having the value "CA". Note that entries 102 and 103 are both members of object class Person, but entry 102 has more listed object attributes than entry 103. In many object-oriented based systems, objects that are members of the same object class may share a common set of possible object attributes, but some members of the class may not necessarily have values for some of the possible attributes. In this example, entry 103 does not have a value for attribute type "Manager" while entry 102 does have a value for this attribute.

Entries 100 and 101 are child entries of entry 99. Entries 100 and 101 are both members of object class "Person." Entry 100 is defined by the following attribute type-value pairs: (1) attribute type "Last Name" with a value of "Doe"; (2) attribute type "First Name" with a value of "John"; (3) attribute type "Tel. No." with a value of "555-1111"; (4) attribute type "Manager" having the value of "Larry Founder"; and (5) attribute type "State" having the value "CA". Entry 101 is defined by the following attribute type-value pairs: (1) attribute type "Last Name" with a value of "Smith"; (2) attribute type "First Name" with a value of "Jim"; (3) attribute type "Tel. No." with a value of "555-2222"; and (4) attribute type "Manager" having the value of "John Doe"; and (5) attribute type "State" having the value "NY".

Figure 2A:
FIGS. 2A, 2B, and 2C depict one approach for storing LDAP data in database tables.
Figure 2B:
Figure 2C:
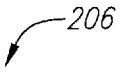

FIGS. 2A, 2B, and 2C depict one approach to storing the LDAP directory entries from DIT 20 of FIG. 5, into a relational database management system ("RDBMS") or other database system using tables. In this approach, a separate table is provided for each object class in the system. FIG. 2A shows an object class table 202 for the Organization class, which includes entry 96 from DIT 20 as a member of that class. FIG. 2B is an example of an object class table 204 for the object class Department, which includes entries 97, 98, and 99. FIG. 2C is an example of an object class table 206 for the object class Person, which includes entries 100, 101, 102, and 103 from DIT 20.

Each row of the object class table represents a single object of that corresponding object class. Thus, the Person class table 206 of FIG. 2C includes four rows, one row for each of the person class entries of DIT 20 (i.e., entries 100, 101, 102, and 103). Discrete columns within the object class table represent attributes of an object within the object class. A separate column us provided for each possible attribute of an object class. The Person class table 206 of FIG. 2C includes five columns for object attributes "Last Name," "First Name," "Tel. No.," "Manager," and "State." Similar rows and columns in FIGS. 2A and 2B describe the objects and attributes for the Department and Organization objects of DIT 20.

An alternate approach to representing the DIT 20 of FIG. 5 in relational tables involves the implementation of a single table that comprises information describing objects and object attributes on the system. This table is hereby referred to as the "attribute_store" table. The attribute_store table comprises four columns having the following characteristics:

| Column Name | Datatype | Constraint | Description |
| --- | --- | --- | --- |
| EID | Number | Not null | ID for an entry |
| AttrName | Character-numeric | | Attribute ID for a particular attribute |
| AttrVal | Character-numeric | | Attribute values |
| AttrKind | Character string | Not null | Kind of Attribute (Operational, User etc.) |

FIG. 4 depicts an example of an attribute_store table 400 for entries in the DIT 20 of FIG. 5. All entries in DIT 20 are represented in attribute_store table 400, regardless of the particular object class that an entry belongs to. An entry is represented by one or more rows in table 400. A set of rows having the same EID describes the attributes for the same entry in DIT 20. Each row shown in attribute_store table 400 corresponds to a separate attribute for an entry.

Consider entry 100 from DIT 20, which is represented in attribute_store table 400 by rows 416, 418, 420, 422, 423, and 446. The combination of the contents of these rows describes the attributes of entry 100. Each row in attribute_store table 400 comprises a column that identifies that row's corresponding EID. These particular rows (416, 418, 420, 422, 423, and 446) are identified as being associated with entry 100 since all of these rows comprise the same value of 100 in their EID column. Each of these rows describes a different attribute for entry 100. For each row, the "Attr-Name" column identifies which object attribute is being described, and the "AttrVal" column identifies the value(s) for that attribute. For entry 100, row 416 describes attribute "First Name" having a value of "John", row 418 identifies the value "Doe" for attribute "Last Name", row 420 identifies the value "555-1111"for attribute "Tel No.", row 422 identifies the value "Larry Founder" for attribute "Manager," and row 423 identifies the value "CA" for attribute "State." Each of the other entries from DIT 20 is similarly represented by sets of one or more rows in the attribute_store table 400.

In an embodiment, the rows in attribute_store table 400 contain an "AttrKind" column. This column identifies additional system categories for the object attributes. For example, one category of attribute kinds that can be identified according to the invention refers to access and modification privileges for particular object attribute. Two examples of attribute kinds relating to access and modification privileges are "User" and "Operational" attributes. User attributes are attributes that can be modified by the user, entity or organization associated with a particular entry. Operational attributes are attributes that are maintained by the system, and thus cannot be altered or modified except by the system. For example, row 420 identifies attribute type "Tel. No." for entry 100 as being of AttrKind user, and thus the user or entity associated with entry 100 is permitted to modify this attribute value. Row 446 provides an example of an attribute type that is of attribute kind "operational" (i.e., "Modification Timestamp"). Many directory systems maintain a timestamp of the last modification time/date for each directory entry. Row 446 describes attribute "modification timestamp" for entry 100 having a value of "01/01/97." Since this attribute type is "operational," the entity or person corresponding to entry 100 is not normally permitted to modify this attribute value. In an alternate embodiment of the invention, the attribute_store table is configured without having a column for the AttrKind value.

Further details regarding the representation of directory information in an attribute_table are described in U.S. application Ser. No. 09/206,778 and U.S. Application Ser. No. 09/207,160, filed on Dec. 7, 1998, both of which are hereby incorporated by reference in their entirety.

Figure 3:
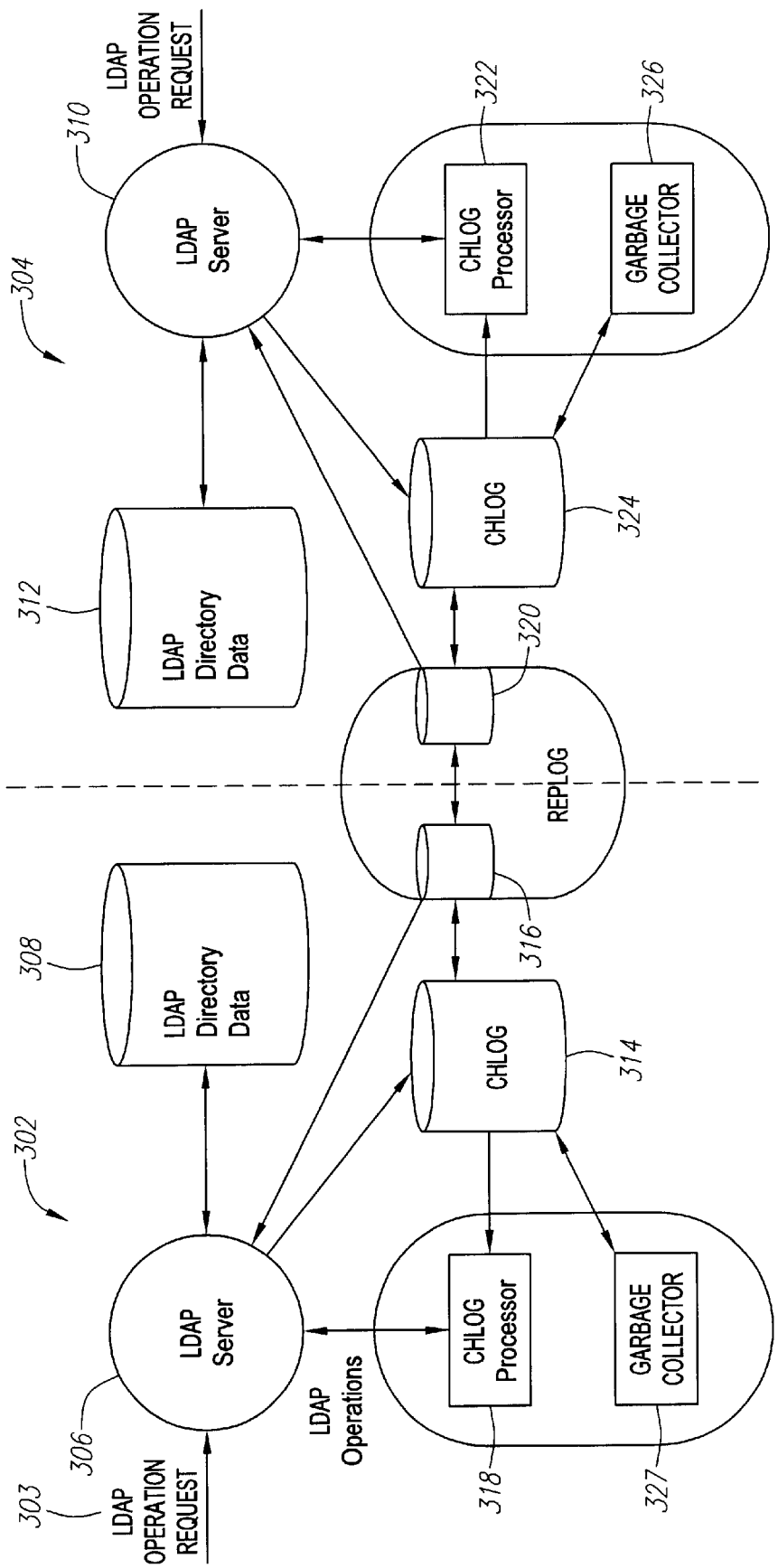
FIG. 3 depicts a system architecture for replicating LDAP directory data according to an embodiment of the invention.

FIG. 3 depicts an embodiment of a system architecture for replication of LDAP directory data according to an embodiment of the invention. Shown in FIG. 3 is a first LDAP site 302 and a second LDAP site 304. LDAP data operation requests 303 at LDAP site 302 are processed by LDAP server 306. Modifications, additions, and deletions to the LDAP directory data 308 at LDAP site 302 are replicated to the directory data 312 at a second LDAP site 304. LDAP site 304 similarly comprises an LDAP server 310 that implements LDAP data operations to LDAP directory data 312.

Consider if the schema and data organizations for the replicated LDAP directory data are different between LDAP sites 302 and 304. Thus, for the purposes of explanation, assume that LDAP site 302 comprises LDAP directory data 308 having the "object class table" schema described with reference to FIGS. 2A–2C. Further assume that LDAP site 304 comprises LDAP directory data 312 having the "attribute_store table" schema described with reference to FIG. 4.

To perform data replication, a standard change record format is utilized to define LDAP data manipulation operations, in which the change record format is recognized and adhered to by each replication site. Change records are propagated to each replication site that describe the data changes made at the originating site. Regardless of the exact schema or data organization in place at each remote replication site, the LDAP server at each site comprises an LDAP engine that can interpret the standard format of the change records to replicate the changes to the local LDAP directory data. In this manner, peer-to-peer data replication can be performed in a heterogeneous environment in which local replication sites are not required to have knowledge of the exact schemas being employed by remote replication sites.

Figure 11:
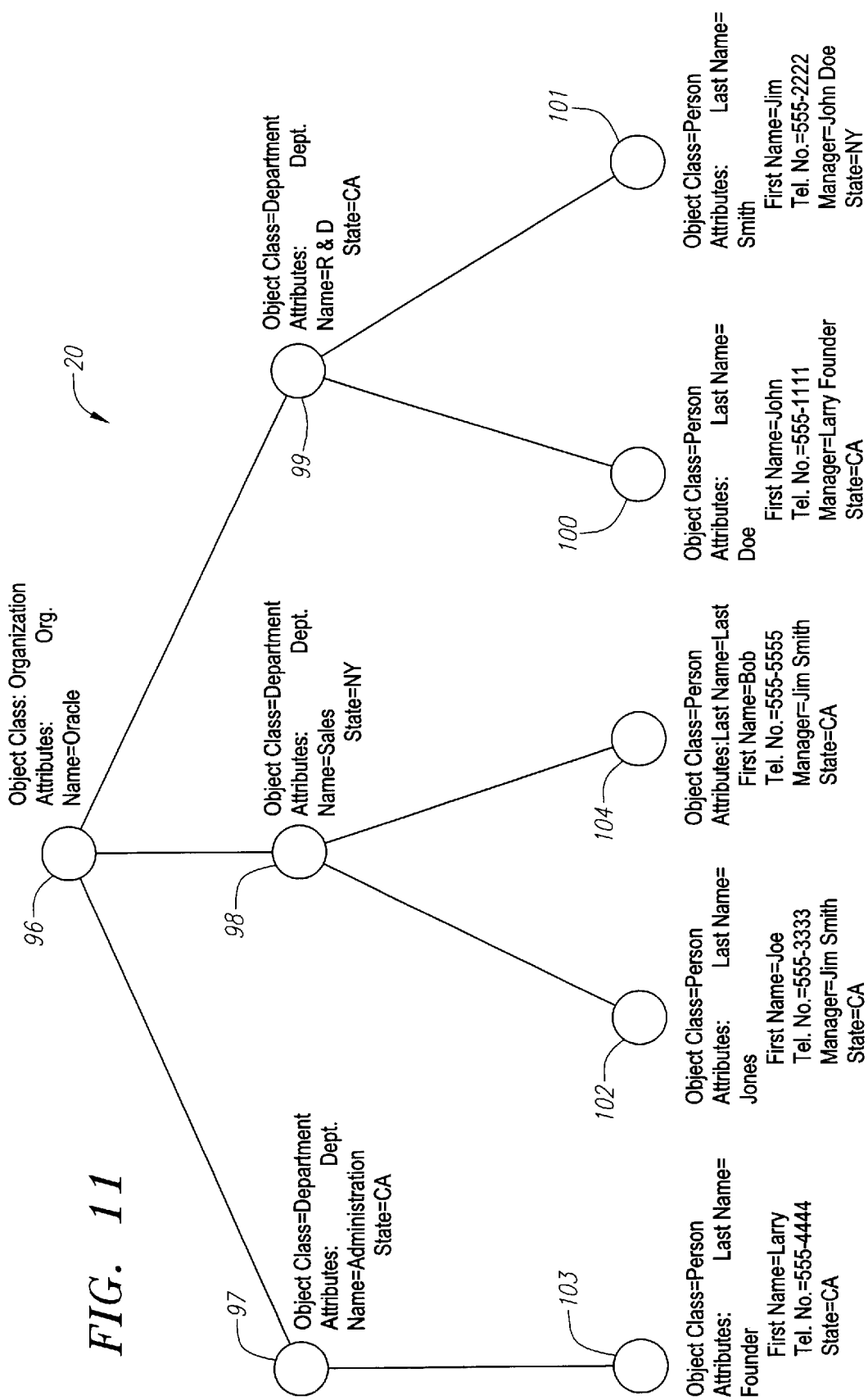
FIG. 11 illustrates a revised version of the directory information tree shown in FIG. 5.

Consider if a client at replication site 302 wishes to add a new LDAP directory entry to the DIT 20 of FIG. 5. The new entry has the following properties: entry no.="104", last name="Last", first name="Bob", tel. No.="555-5555", state="CA", and Manager="Jim Smith". FIG. 11 depicts DIT 20 after new entry 104 is added to the directory tree.

The following SQL-based pseudocode represents a database statement that can be used to implement this change at replication site 302 (where the LDAP directory data 308 is stored as shown in FIGS. 2A–C):

INSERT INTO Person_Class_Table (/*column names*/
    Entry No., Last name, First Name, Tel. No., State, Manager) VALUES (/*column values*/ 104, 'Last', 'Bob', '555-5555', 'CA', 'Jim Smith')

By executing this database statement, the new directory entry would be added to the Person Class Table 206 within the LDAP directory data 308 of replication site 302. FIG. 8 depicts a revised Person Class Table 806 in which row 809 represents newly added directory entry 104.

This change to the LDAP directory data cannot be replicated at replication site 304 by merely re-executing the same database statement. This is because the schema organization of LDAP site 304, as shown in FIG. 4, is significantly different than the schema organization of LDAP site 302 shown in FIGS. 2A–C. Since the above database statement is specific to the schema of LDAP site 302, it would not properly reproduce the desired changes to the directory data 312 at LDAP site 304.

In the present invention, when LDAP server 306 applies the requested LDAP data operation to the LDAP directory data 308, a change log entry is made to the change log 314 at LDAP site 302. The change log entry contains the requested LDAP data operation in a canonical format that is consistent across all participating replication sites. The change log entry in the change log 314 contains sufficient information to replicate the requested change to the LDAP directory data at any remote site, including remote LDAP site 304. According to an embodiment, the change log entries are generated into conventional LDAP command protocols that have been standardized for LDAP directory data.

The embodiment of FIG. 3 also includes the use of a shadow log to propagate changes from one replication site to another. Change log entries from change log 314 are copied to a replication log 316 to be propagated to other replication sites. Replication log 316 is a shadow of change log 314, and its use prevents the need to bring down all LDAP databases when schema changes are propagated to the replication sites, such as the addition or deletion of LDAP databases from the replication environment. In essence, shadow logs are utilized to insulate the format of local replication logs from the actual mechanism used to propagate changes to other replication sites. In this manner, the internal schema formats of the replication sites are encapsulated by the shadow logs, such that schema changes can be made without downtime to the replication nodes.

A process runs at the LDAP directory site 302 to copy information from the change log 314 to the replication log 316. Either asynchronous or synchronous replication can be implemented using the invention. For asynchronous replication, the copying of entries from the change log 314 to the replication log 316 occurs either periodically, or upon certain specified trigger conditions. The change information is propagated and applied to remote LDAP sites in a queued "store-and-forward" process. For synchronous replication, the system constantly monitors the change log for the arrival of new entries. If a new entry is generated at the change log 314, the new entry is immediately copied to the replication log 316 for propagation to remote LDAP sites.

The change log information copied to the replication log 316 at the local LDAP directory site 302 is propagated to the replication log 320 at remote LDAP site 304. In the preferred embodiment, the mechanism used to replicate this information is the Advanced Symmetric Replication mechanism from the Oracle 8i database management system, available from Oracle Corporation of Redwood Shores, Calif.

At the remote LDAP site 304, the change log entry in replication log 320 is directly sent to LDAP server 310 for processing. Alternatively, the change log entry in replication log 320 can be copied to change log 324 before being sent to LDAP server 310. A daemon process 322 initiates the application of the change log entry to the LDAP directory data 312 at LDAP site 304. If asynchronous replication is employed, the daemon process 322 wakes up periodically based upon defined intervals or upon specified trigger conditions to initiate the changes. If synchronous replication is employed, daemon process 322 actively monitors for any incoming change log information that has been propagated by a remote LDAP site. With synchronous replication, once the changes have been implemented, an acknowledgement is sent back to the propagating LDAP site.

To implement the changes at LDAP site 304, the daemon process 322 prompts LDAP server 310 to implement the changes. As noted above, the change log entry is in a schema-independent canonical format. LDAP server 310 analyzes the change information, determines which local data items are to be changed, and formulates a database statement that is capable of implementing the replicated LDAP data operation to data under the local schema and data organization. Thus, if the LDAP directory data is stored as shown in FIG. 4, the following SQL-based pseudocode represents the database statement to be generated to replicate the above change to the LDAP directory data 312 at LDAP site 304:

INSERT INTO Attribute_Store_Table (/*column names*/ EID, AttrName, AttrVal, AttrKind) VALUES (/*column values*/ 104, 'First Name', 'Bob', 'User');

INSERT INTO Attribute_Store_Table (/*column names*/ EID, AttrName, AttrVal, AttrKind) VALUES (/*column values*/ 104, 'Last Name', 'Last', 'User');

INSERT INTO Attribute_Store_Table (/*column names*/ EID, AttrName, AttrVal, AttrKind) VALUES (/*column values*/ 104, 'Tel. No.', '555-5555', 'User');

INSERT INTO Attribute_Store_Table (/*column names*/ EID, AttrName, AttrVal, AttrKind) VALUES (/*column values*/ 104, 'Manager', 'Jim Smith', 'User');

INSERT INTO Attribute_Store_Table (/*column names*/ EID, AttrName, AttrVal, AttrKind) VALUES (/*column values*/ 104, 'State', 'CA', 'User');

The LDAP server 310 may reference a data dictionary or other metadata to determine the appropriate schema objects to be accessed to implement the data changes. Thus, the database statement to be formulated by LDAP server 310 is normally tied to the exact schema and data organization of the local LDAP site 304.

A garbage collector 326 is used to purge the change log 324 at LDAP site 304. The garbage collector 326 is a daemon process that periodically wakes up based upon predefined intervals. Similarly, a garbage collector 327 is used to purge the change log 314 at LDAP site 302.

Figure 9:
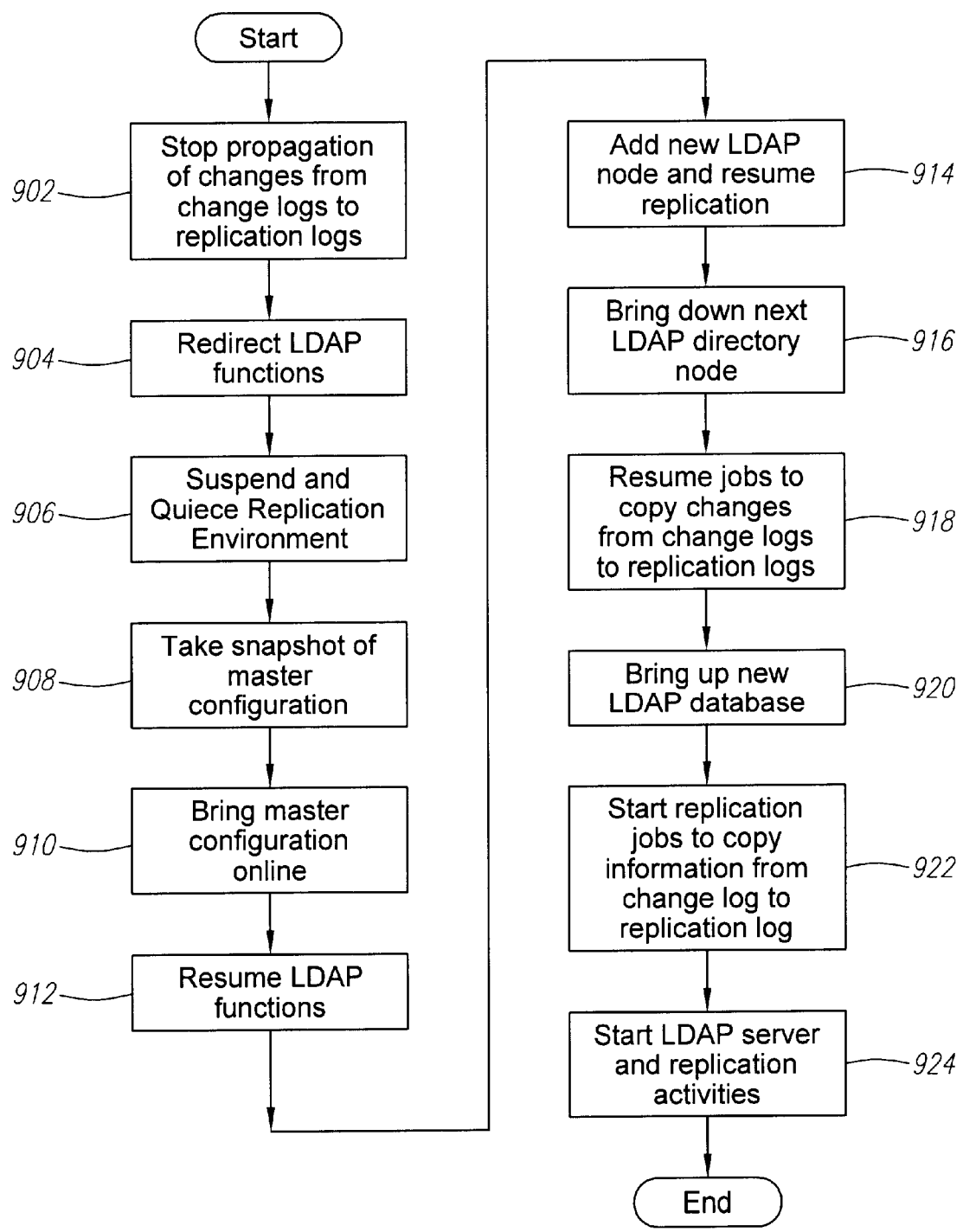
FIG. 9 is a flow diagram showing a process for adding a new LDAP site to a replication environment according to an embodiment of the invention.

FIG. 9 depicts the process flow of an embodiment of the invention to add a new LDAP site to an existing replication environment. The following describe the process actions of this process flow:

1. Stop the processes that propagate changes from change logs to replication logs tables at all sites (process action 902).

2. Redirect all LDAP functions from a master definition/configuration database (process action 904). In an embodiment of the invention, a master definition/configuration database is maintained to control configuration information regarding replication nodes, such as node identifiers, location, etc. Any of the replication nodes can be designated as the master definition/configuration site.

3. Suspend and quiesce the replication environment (process action 906). This ensures that all data presently at the replication logs are propagated to all sites by the replication mechanism.

4. Build a snapshot of the master definition/configuration database (process action 908). In an embodiment, building the snapshot comprises the performance of an online backup. A database log switch can be performed before the online backup. The master definition/configuration database can be triple-mirrored for quicker online backup.

5. Bring the master definition/configuration database back online (process action 910).

6. Resume all LDAP functions on master definition/configuration site (process action 912).

7. Add the new LDAP site to the replication environment, by adding the replication log table for the new site to the replicated environment and regenerating the replication support (914). At this point replication resumes between the LDAP sites.

8. Bring down the new LDAP directory site (process action 916).

9. Resume the jobs that copy information from change logs to replication logs (process action 918). Now all LDAP sites are fully available, except for the new LDAP database that is being added.

10. Bring up the LDAP new database (process action 920). This is performed by first bringing up the new database without the replication processes. The new database is then brought down and recreated using the backup of master definition/configuration database. Database administration changes are made for the new database (e.g., network names, database names, file names that may need to be changed, etc.). The Replication catalog tables are dropped into the new database and recreated.

11. At the new LDAP site, start replication processes as well as the processes that copy change information from the change log to the replication log (process action 922).

12. Start LDAP server and replication mechanism at the new LDAP site (process action 924).

The following describes an alternate process to add a new node to a replication system:

1. Stop the replication server on all replication nodes.

2. Configure the new node into the same replication group as the existing replication nodes. "Replication agreements" can be established to maintain entries which describe the member nodes within a replication group that shares and replicates data changes. Replication agreements are referenced for configuration parameters when the replication server operates. In an embodiment, replication configuration parameters and replication agreements are stored as entries in an LDAP directory information tree.

3. Identify a sponsor node and switch the sponsor node to read-only mode. The sponsor node is an existing replication node that supplies data to the new replication node. According to an embodiment, when the sponsor node is in read-only mode, updates cannot be made to the sponsor node, but are allowed to any of the other nodes.

4. Back up sponsor node. If this action requires a lengthy time period, process action 5 may be configured to run concurrently with process action 4.

5. Perform setup of the add node procedure. This executes a number of operations, including:
quiesce the replication process at any master definition sites;
configure the master definition sites and the new node as well as other sites that participate in the LDAP replication;
configure replication push jobs to all sites including the new node;
check to make sure that all steps have completed successfully.

6. Switch the sponsor node to updatable (read-write) mode.

7. Start the replication server on all nodes except the new node. At this time, verify that no replication processes are running on the new node.

8. Load data into the new node.

9. Start the LDAP server on the new node.

10. Configure the LDAP replication agreement on the new node. In an embodiment, these parameters include the following:
Retry count: this parameter identifies the number of processing retry attempts for a change entry before being dropped;
Purge schedule: this parameter indicates the frequency at which entries that have already been applied or have been dropped are purged by a garbage collector;
Threads: this parameter identifies the number of worker threads provided for each supplier for change log processing;
Replication agreement: identifies the replication agreement for which a server is responsible;
Replication protocol: specifies the protocol used in the replication agreement; for Oracle-based replication nodes, this parameter is set to ASR.

11. Start the replication server on the new node.

Figure 10:
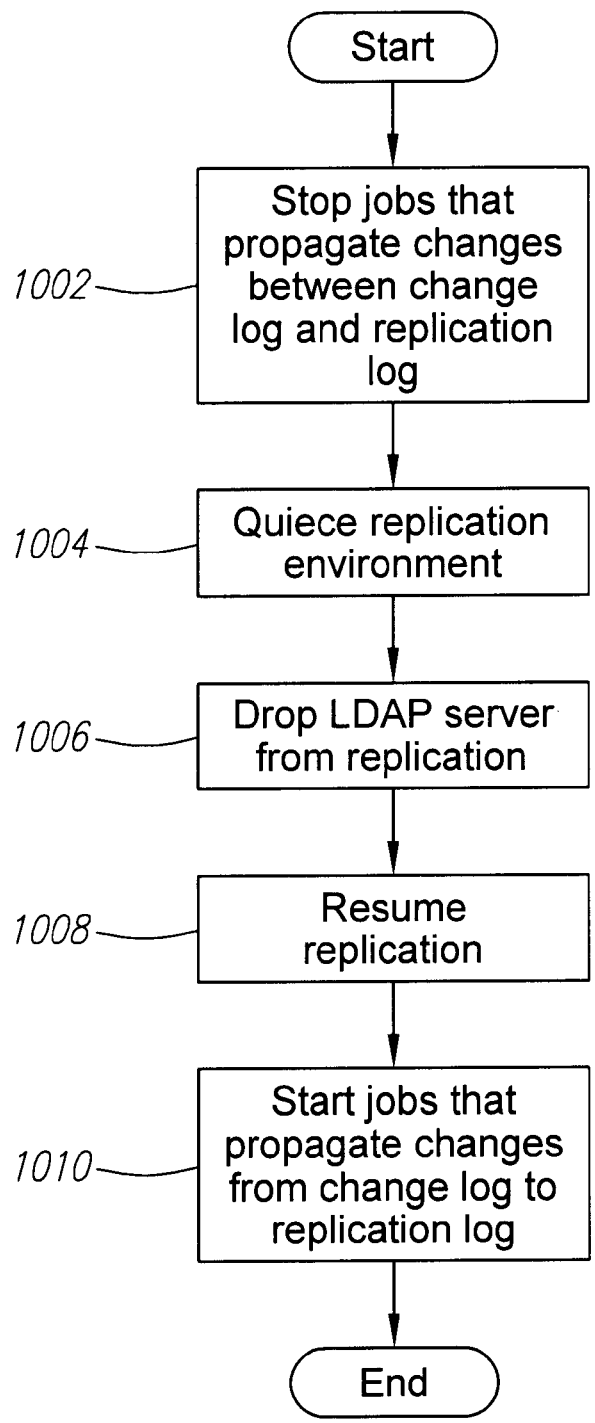
FIG. 10 is a flow diagram showing a process for removing an LDAP site from a replication environment according to an embodiment of the invention.

FIG. 10 depicts the process flow of an embodiment of a process to remove an existing LDAP directory site from a replication environment. The following describe the process actions for this process flow:

1. Stop processes that propagate change information the change log and replication log at each LDAP directory site (process action 1002).

2. Quiesce the replication environment (process action 1004).

3. Drop the LDAP server from replication (process action 1006).

4. Resume replication activities at all other LDAP sites (process action 1008).

5. Start the process that were stopped in process action 1002 (process action 1010).

In an embodiment, the attribute_store table of FIG. 4 is modified to include an additional column for replication information. Thus, the attribute_store table in an replication environment contains columns having the following characteristics:

| Column Name | Datatype | Constraint | Description |
| --- | --- | --- | --- |
| EID | Number | Not null | ID for an entry |
| AttrName | Character-numeric | | Attribute ID for a particular attribute |
| AttrVal | Character-numeric | | Attribute values |
| AttrKind | Character string | Not null | Kind of Attribute (Operational, User etc.) |
| AttrVer | Character String | | Attribute version and timestamp |

The AttrVer column describes the version of an attribute for an LDAP directory entry. Each time an attribute is modified, the version number of that attribute is incremented and the timestamp is adjusted to the most recent modification time.

Change Log Processing and Conflict Resolution

The following processes are utilized in an embodiment of the invention to address inbound change log processing and conflict resolution on a consumer directory. According to this embodiment, at least the following five kinds of inbound changes are addressed, including: (1) adding information; (2) deleting information; (3) modifying information; (4) moving leaf entry in a directory tree (resulting in a name change); and, (5) moving a subtree to a different location in directory tree.

Multi-master replication enables updates to multiple replication sites. Thus, a mechanism is needed to address the possibility of conflicting updates. Conflicts should be detected, for example, when the replication server attempts to apply changes from a remote directory to another directory that holds conflicting data.

Entry-level conflicts are caused when the replication server attempts to apply a change to a consumer directory that results in a conflict, such as:

adding an entry that already exists;

deleting an entry that does not exist; or modifying an entry that does not exist.

Attribute-level conflicts are caused when two directories are updating the same attribute with different values, possibly at different times. One approach to address attribute-level conflicts is to examine timestamps of the changes involved in the conflict.

Generally, the present embodiment attempts to resolve conflicts by applying the following process:

1. Attempt to detect conflict when a change is applied or upon detection of error;
2. Attempt to re-apply the change a configurable number of times or for a configurable amount of time after a waiting period;
3. If the retry limit is reached without successfully applying the change, then the change request is escalated to a different-priority queue for processing.

According to this embodiment, three change log processing queues are employed. When a change first arrives to the consumer directory, it is placed in a "new queue". An attempt is then made to apply the change. If it fails to be applied in the new queue, the change will be put to a "retry queue". If it fails to be applied after a specified number of attempts in the retry queue, the change will be placed to a "Human Intervention queue" and re-attempted at a much lower rate. If it succeeds to be applied from one of the above 3 queues, it will be placed to the purge queue for garbage collection.

The following processes are employed to implement the change/conflict check procedures:

The following process matrix is employed to apply an "add" change request:

| Change type | Step 1. Entry (name) Conflict Check | Step 2. Apply change | New Queue | Retry Queue | Human Intervention Queue |
|---|---|---|---|---|---|
| Add | Search for the parent entry in directory tree that matches with the object identifier (GUID) in the change entry. If the parent entry exists, continue with step 2. | Compose the correct identifier (distinguished name or DN) for the entry being added under its parent entry identified by GUID in the consumer directory. Apply the change in the consumer directory. | (a) Perform step 1 and 2. (b) If both steps succeed put the change to purge queue (c) If one of the two steps fails, put the change into retry queue and set the retry count to the configured maximum. | (a) Repeat step 1 and 2. (b) If both steps succeed put the change to purge queue (c) If one of the two steps fails, decrement the retry count of the change entry. (d) If change fails on the last retry because of a duplicated target entry, apply conflict resolution as follows: Older creation time stamp wins. If there is a tie, the smaller GUID wins. (e) If one of steps 1&2 fails on the last retry for any reasons other than duplicate DN, put the change into Human Intervention queue. | NOTE: A change entry would typically get into this queue if the parent entry fails to be located in the consumer directory during the period of normal retry. Same steps as in retry queue processing with the exception of step (c). If there are failures, the entry is retained in this queue until human intervention. |

The following process matrix is employed to apply a "delete" change request:

| Change type | Step 1. Entry (name) Conflict Check | Step 2. Apply change | New Queue | Retry Queue | Human Intervention Queue |
|---|---|---|---|---|---|
| Delete | Search for the entry in the directory tree matched with the object identifier (GUID) in the change entry. | Delete the entry found in step 1. | (a) Perform step 1 and 2. (b) If both steps succeed put the change to purge queue (c) If one of the two steps fails, put the change into retry queue and set the retry count to the configured maximum. | (a) Repeat steps 1 & 2. (b) If both succeed put the change to purge queue. (c) If either of the two steps fails, decrement the retry count in the change entry. (d) If either of the two steps fails on the last retry move the change to the human intervention queue. | Same steps as in retry queue processing with the exception of step (c). If there are failures, the entry is retained in this queue until human intervention. |

The following process matrix is employed to apply a "modify" change request:

| Change type | Step 1. Entry (name) Conflict Check | Step 2. a. Attribute Conflict Check (for Modify only). b. Apply change. | New Queue | Retry Queue | Human Intervention Queue |
|---|---|---|---|---|---|
| Modify | Search for the correct unique identifier (distinguished name or DN) in the target directory that matches with the object identifier (GUID) in the change entry. | a. Filter the modification in change entry by comparing each attribute in change entry against the one in target entry. (1. newer modify time wins. 2. greater version wins. 3. smaller hostname using string comparison rule wins.). b. Apply the filtered modification. | (a) Perform step 1 and 2. (b) If both steps succeed put the change to purge queue (c) If one of the two steps fails, put the change into retry queue and set the retry count to the configured maximum. | (a) Repeat steps 1 & 2. (b) If both succeed put the change to purge queue. (c) If either of the two steps fails, decrement the retry count in the change entry. (d) If either of the two steps fails on the last retry move the change to the human intervention queue. | Same steps as in retry queue processing with the exception of step (c). If there are failures, the entry is retained in this queue until human intervention. |

The following process matrix is employed to apply a "modifyRDN" change request to move a leaf entry in the directory information tree (which results in a name change by modifying the relative distinguished name-RDN):

| Change type | Step 1. Entry (name) Conflict Check | Step 2. Apply change | New Queue | Retry Queue | Human Intervention Queue |
|---|---|---|---|---|---|
| Modify RDN | Search for the current unique identifier (distinguished name or DN) that matches with the object identifier (GUID) in the change entry. | Perform modify RDN operation using the current DN acquired from step 1. | (a) Perform step 1 and 2. (b) If both steps succeed put the change to purge queue (c) If one of the two steps fails, put the change into retry queue and set the retry count to the configured maximum. | (a) Repeat step 1 and 2. (b) If both steps succeed put the change to purge queue (c) If one of the two steps fails, decrement the retry count of the change entry. (d) If change fails on the last retry because of a duplicated target entry, apply conflict resolution as follows: Older creation time stamp wins. If there is a tie, the smaller GUID wins. (e) If one of steps 1&2 fails on the last retry for any reasons other than duplicate DN, put the change into Human Intervention queue. | Same steps as in retry queue processing with the exception of step (c). If there are failures, the entry is retained in this queue until human intervention. |

The following process matrix is employed to apply a "modify DN" change request to move a subtree into a different location in the information directory tree (by modifying the distinguished name DN):

| Change type | Step 1. Entry (name) Conflict Check | Step 2. Apply change | New Queue | Retry Queue | Human Intervention Queue |
|---|---|---|---|---|---|
| Modify DN | Search for the current unique identifier (distinguished name or DN) that matches with the object identifier (GUID) in the change entry. Search for the new parent DN that matches with the parent GUID in the change entry. | Perform the modify DN operation using the current DN and new parent DN acquired from step 1. | (a) Perform step 1 and 2. (b) If both steps succeed put the change to purge queue (c) If one of the two steps fails, put the change into retry queue and set the retry count to the configured maximum. | (a) Repeat step 1 and 2. (b) If both steps succeed put the change to purge queue (c) If one of the two steps fails, decrement the retry count of the change entry. (d) If change fails on the last retry because of a duplicated target entry, apply conflict resolution as follows: Older creation time stamp wins. If there is a tie, the smaller GUID wins. (e) If one of steps 1&2 fails on the last | Same steps as in retry queue processing with the exception of step (c). If there are failures, the entry is retained in this queue until human intervention. |

-continued

| Change type | Step 1. Entry (name) Conflict Check | Step 2. Apply change | New Queue | Retry Queue | Human Intervention Queue |
|---|---|---|---|---|---|
| | | | | retry for any reasons other than duplicate DN, put the change into Human Intervention queue. | |

Example 1

Add "dc=com2" on both Node 1 and Node 2 in a three node replication system.
The detailed process state information for example 1 is as follows:

At Time t
Node 1:
  Add dc=com2
  With GUID: 00001
Node 2:
  Add dc=com2
  With GUID: 00002
Node 3:
  NA A conflict exists at time t since there are duplicated DN on the consumer directory for multiple nodes. To resolve this conflict, compare the creation time between the change and the consumer entries, favoring the one with older creation time. If creation time ties, the smaller GUID wins. The end result should be a situation in which both nodes end up with "dc=com2" having GUID: 00001.

At Time t+1
Node 1:
  The addition change "add dc=com2" supplied by node2 arrived to "new queue".
  1. Change processing in "new queue":
  Step1: Skipped parent GUID check since the target DN in the change entry was a first level entry.
  Step2: Applied the "dc=com2" add change to node1 and got duplicated DN error.
  Set retry count of the change to the configured maximum and moved it to "retry queue".
  2. Change processing in "retry queue":
  Repeated step 1 and 2 and failed on configured number of retries.
  Compared the creation time between the change entry with the target entry. They tied at "time t".
  Compared the GUID in the change entry with the target entry and found the GUID value in the change entry was greater than the one in target entry. Hence, moved the change to purge queue.
Node 2:
  NA
Node 3:
  NA
At Time t+2
Node 1:
  NA
Node 2:
  The addition change "add dc=com2" supplied by node2 arrived to "new queue".

1. Change processing in "new queue":
  Step1: Skipped parent guid check since the target DN in the change entry was a first level entry.
  Step2: Applied the add "dc=com2" change to node 1 and got duplicated DN error.
Set retry count of the change to the configured maximum and moved it to "retry queue".
2. Change processing in "retry queue":
  Repeated step 1 and 2 and failed on configured number of retries.
  Compare the creation time of the change entry with the target entry.
  They tied at "time t".
  Compared the GUID in the change entry with the target entry and found the GUID value in the change entry was smaller than the one in the target entry. Hence, deleted the target entry and applied the change.
Node 3:
  NA
At Time t+3
Node 1:
  NA
Node 2:
  NA
Node 3:
  Change supplied by node 1 and node 2 all arrived to "new queue". One of the two changes applied first. Then, the change applied later received a duplicated DN error. The change supplied by node 1 with the smaller GUID eventually superseded the other change and added to node 3.
At time t+4
Node 1:
  dc=com2
  With GUID: 00001
Node 2:
  dc=com2
  With GUID: 00001
Node 3:
  dc=com2
  With GUID: 00001

Example 2

Add "dc=com2", delete it and add it back on both node 1 and node 2 in a three node replication system. Note that the creation time/GUID combination applied in the following example is just one out of many possibilities, and is not intended to be limiting as to the scope of formats.
The detailed process state information for example 2 is as follows:
At Time t
Node 1:

Add "dc=com2"
  With GUID=00003
Node 2:
  Add "dc=com2"
  With GUID=00006
Node 3:
  NA A conflict exists because there are duplicated DN for the ad request. However, objects with the same GUID does not exist for delete.

The conflict resolution solution for add on node 1: After failing on configured number of retires, the add change with GUID:00006 created at time 0 superseded the existing entry with GUID:00005 created at time 2. The add change with GUID:00004 created at time 2 was dropped.

The conflict resolution solution for add on node 2: After failing on configured number of retires, the add change with GUID:00003 created at time 0 superseded the existing entry with GUID:00004 created at time 2. The add change with GUID:00005 created at time 2 was dropped.

The conflict resolution for delete: The delete change failed a number of times until the "add" change with the same GUID applied to the target node. End result: "dc=com2" was removed from both directories.

At Time t+1
Node 1:
  Delete "dc=com2"
  With GUID=00003
Node 2:
  Delete "dc=com2"
  With GUID=00006
Node 3:
  NA
At Time t+2
Node 1:
  Add "dc=com2"
  With GUID=00005
Node 2:
  Add "dc=com2"
  With GUID=00004
Node 3:
  NA
At Time t+3
Node 1:
  The three changes supplied by node 2 arrived at "new queue". All three changes failed and are moved into the retry queue. The add change with GUID:00006 superseded the target entry with GUID:00005 after maximum configured number of retries.
  The add change with GUID:00004 dropped because it was created at a later time than the add change with GUID:00006.
  The delete change with GUID:00006 eventually succeeds.
Node 2:
  The three changes supplied by node 1 arrived at "new queue". All three changes failed and are moved into retry queue. The add change with GUID:00003 created at time 0 superseded the target entry with GUID:00004 created at time 2 after the configured number of retries.
  The add change with GUID:00005 dropped because it was created at a later time than the add change with GUID:00003.
  The delete change with GUID:00003 eventually succeeds.
Node 3:
  six changes arrived to "new queue".
  The race condition is similar to what happened on node 1 and node 2.
At Time t+4
Node 1:
  "dc=com2" no longer exists.
Node 2:
  "dc=com2" no longer exists.
Node 3:
  "dc=com2" no longer exists.

The following queue parameters are employed in an embodiment of the invention:

|  | New queue | Retry queue | Human Intervention queue | Purge queue |
|---|---|---|---|---|
| Retry count in change entry | 0 | >0 | −1 | −2 |
| Change number in change entry | >last change number applied in change log. | <=last change number applied in change log. | <=last change number applied in change log. | <=last change number applied in change log. |

According to an embodiment, the following additional considerations are applied to replication processing:

a. A delete issued from the replication server triggers a subtree deletion. This stems from the policy that an entry delete has precedence over any subsequent addition of children under that entry.

b. The replication server skips the parent GUID checking when replicating a first level entry to a consumer directory since there is no real parent entry for a first level entry.

c. In one change log processing cycle, there can be multiple "modify" changes modifying the same attribute of the same entry. Because of this, multiple worker threads can be applying changes modifying a same attribute of the same entry in a race. The replication server provides synchronization logic between worker threads to ensure attribute convergence in such a race condition.

d. To ensure schema and group modification convergence, "modify add" or "modify delete" operations should not be allowed to overlap with "modify replace", and vice versa. Any "modify add" or "modify delete" for schema or group entries should only be performed after any previous "modify replace" (and vice versa) of the same entry has been replicated to all the consumer directories.

SYSTEM ARCHITECTURE OVERVIEW

Figure 6:
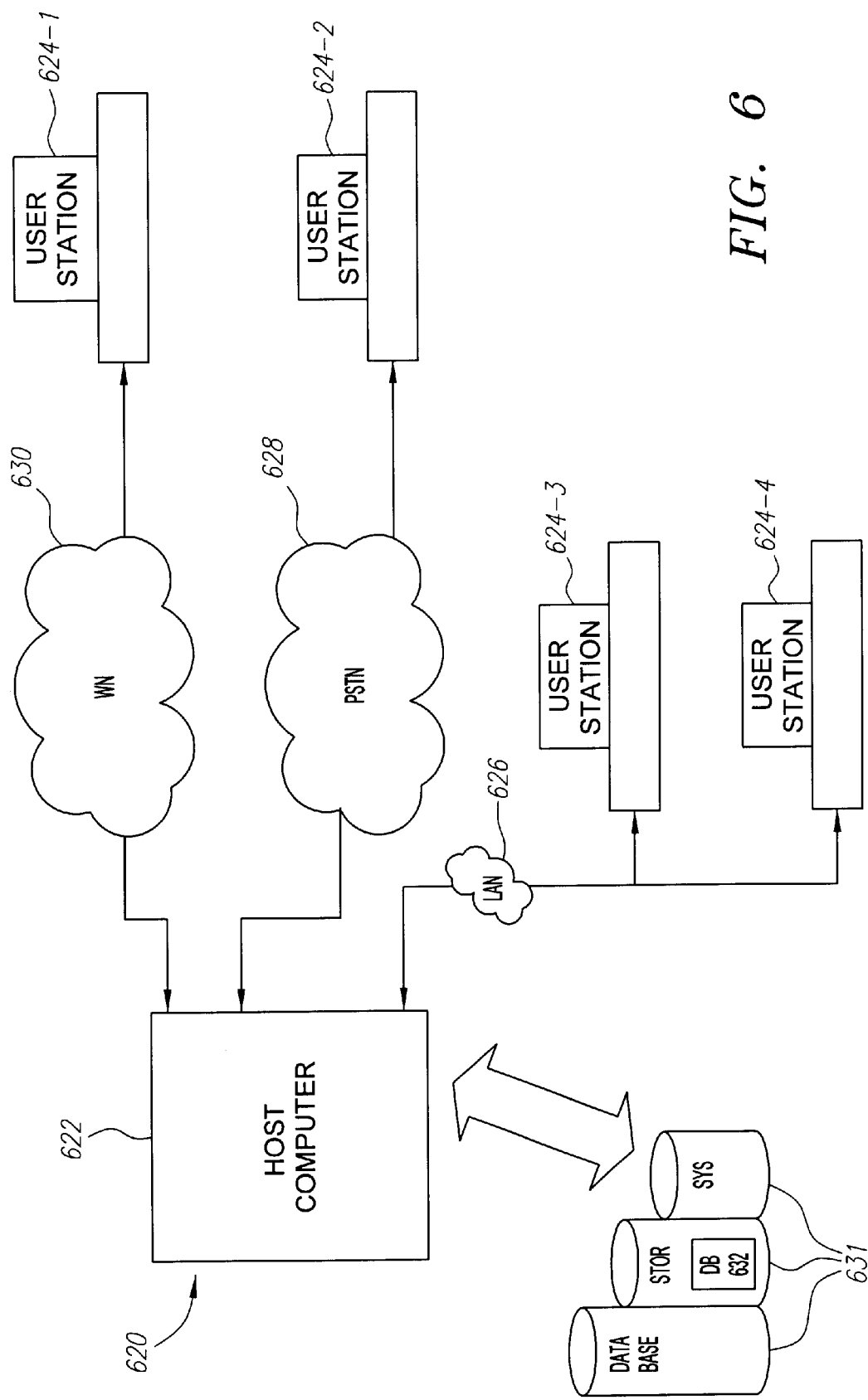
FIG. 6 is a diagram of a computer hardware system with which the present invention can be implemented.

Referring to FIG. 6, in an embodiment, a computer system 620 includes a host computer 622 connected to a plurality of individual user stations 624-1, 624-2, 624-3, and 624-4. In an embodiment, the user stations 624-1, 624-2, 624-3, and 624-4, each comprise suitable data terminals, for example, but not limited to, e.g., personal computers, portable laptop computers, or personal data assistants ("PDAs"), which can store and independently run one or more applications, i.e., programs. For purposes of illustration, some of the user stations 624-3 and 624-4 are connected to the host computer 622 via a local area network ("LAN") 626. Other user stations 624-1 and 624-2 are remotely connected to the host computer 622 via a public switched telephone network ("PSTN") 628 and/or a wireless network 630.

In an embodiment, the host computer 622 operates in conjunction with a data storage system 631, wherein the data storage system 631 contains a database 632 that is readily accessible by the host computer 622.

In alternative embodiments, the database 632 may be resident on the host computer, stored, e.g., in the host computer's ROM, PROM, EPROM, or any other memory chip, and/or its hard disk. In yet alternative embodiments, the database 632 may be read by the host computer 622 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 622 can access two or more databases 632, stored in a variety of mediums, as previously discussed.

Figure 7:
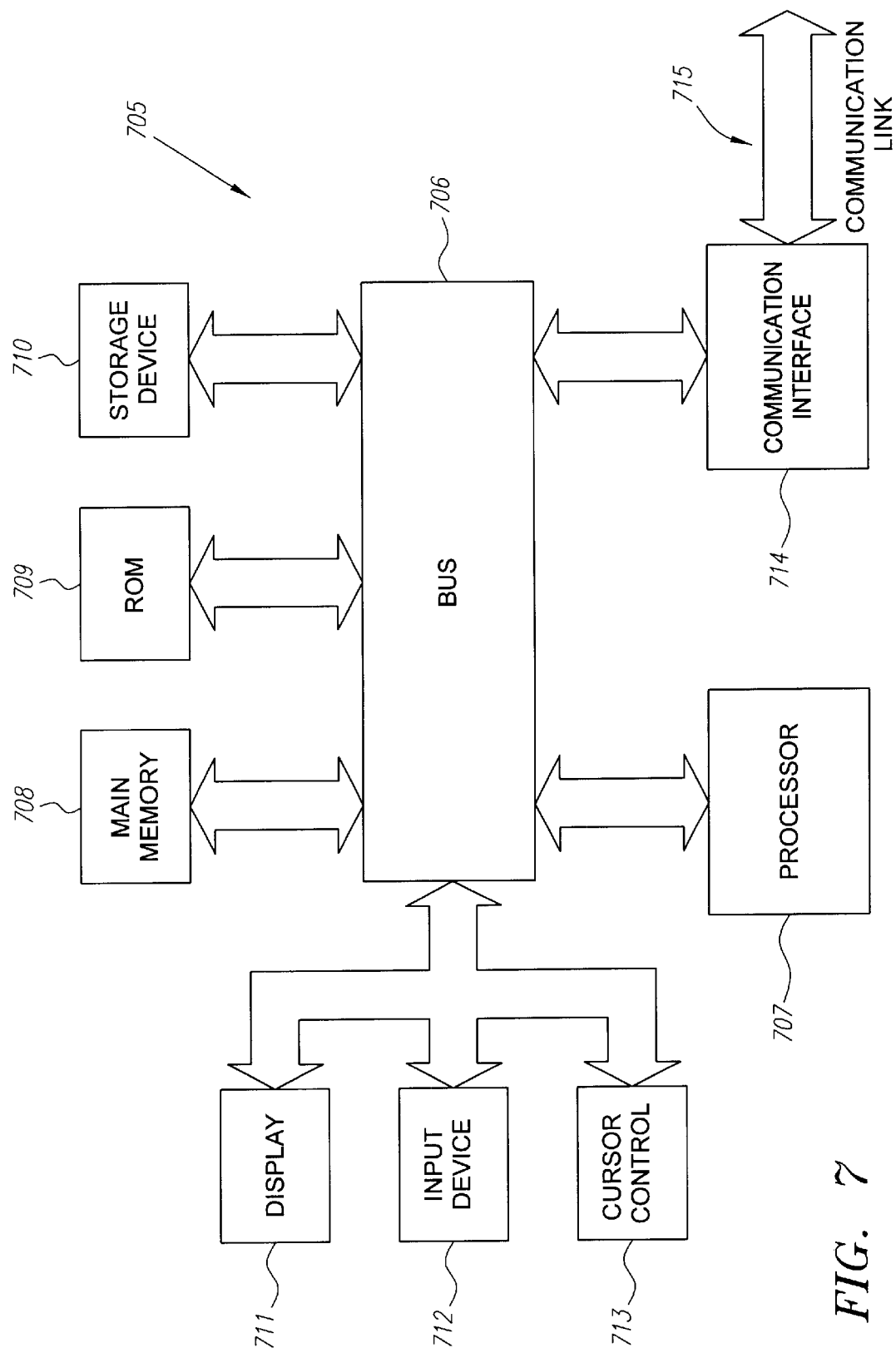
FIG. 7 is an additional diagram of computer hardware system with which the present invention can be implemented.

Referring to FIG. 7, in an embodiment, user stations 624-1, 624-2, 624-3, and 624-4 and the host computer 622, each referred to generally as a processing unit, embodies a general architecture 705. A processing unit includes a bus 706 or other communication mechanism for communicating instructions, messages and data, collectively, information, and one or more processors 707 coupled with the bus 706 for processing information. A processing unit also includes a main memory 708, such as a random access memory (RAM) or other dynamic storage device, coupled to the bus 706 for storing dynamic data and instructions to be executed by the processor(s) 707. The main memory 708 also may be used for storing temporary data, i.e., variables, or other intermediate information during execution of instructions by the processor(s) 707.

A processing unit may further include a read only memory (ROM) 709 or other static storage device coupled to the bus 706 for storing static data and instructions for the processor (s) 707. A storage device 710, such as a magnetic disk or optical disk, may also be provided and coupled to the bus 706 for storing data and instructions for the processor(s) 707.

A processing unit may be coupled via the bus 706 to a display device 711, such as, but not limited to, a cathode ray tube (CRT), for displaying information to a user. An input device 712, including alphanumeric and other keys, is coupled to the bus 706 for communicating information and command selections to the processor(s) 707. Another type of user input device may include a cursor control 713, such as, but not limited to, a mouse, a trackball, a fingerpad, or cursor direction keys, for communicating direction information and command selections to the processor(s) 707 and for controlling cursor movement on the display 711.

According to one embodiment of the invention, the individual processing units perform specific operations by their respective processor(s) 707 executing one or more sequences of one or more instructions contained in the main memory 708. Such instructions may be read into the main memory 708 from another computer-usable medium, such as the ROM 709 or the storage device 710. Execution of the sequences of instructions contained in the main memory 708 causes the processor(s) 707 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 707. Such a medium may take many forms, including, but not limited to, non-volatile, volatile and transmission media. Non-volatile media, i.e., media that can retain information in the absence of power, includes the ROM 709. Volatile media, i.e., media that can not retain information in the absence of power, includes the main memory 708. Transmission media includes coaxial cables, copper wire and fiber optics, including the wires that comprise the bus 706. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 707 can retrieve information.

Various forms of computer-usable media may be involved in providing one or more sequences of one or more instructions to the processor(s) 707 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 706 may receive the infrared signals and place the instructions therein on the bus 706. The bus 706 may carry the instructions to the main memory 708, from which the processor(s) 707 thereafter retrieves and executes the instructions. The instructions received by the main memory 708 may optionally be stored on the storage device 710, either before or after their execution by the processor(s) 707.

Each processing unit may also include a communication interface 714 coupled to the bus 706. The communication interface 714 provides two-way communication between the respective user stations 624-1, 624-2, 624-3, and 624-4 and the host computer 622. The communication interface 714 of a respective processing unit transmits and receives electrical, electromagnetic or optical signals that include data streams representing various types of information, including instructions, messages, and data.

A communication link 715 links a respective user station 624 and a host computer 622. The communication link 715 may be a LAN 626, in which case the communication interface 714 may be a LAN card. Alternatively, the communication link 715 may be a PSTN 628, in which case the communication interface 714 may be an integrated services digital network (ISDN) card or a modem. Also, as a further alternative, the communication link 715 may be a wireless network 630.

A processing unit may transmit and receive messages, data, and instructions, including program, i.e., application, code, through its respective communication link 715 and communication interface 714. Received program code may be executed by the respective processor(s) 707 as it is received, and/or stored in the storage device 710, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A process for database replication comprising:
   receiving a change request to modify data at a first replication site;
   implementing said change request at said first replication site;
   generating a change record corresponding to said change request; said change record having a schema independent format;
   sending said change record to a second replication site; and
   implementing said change record to a copy of said data at said second replication site.

2. The process of claim 1 in which said change request is directed to LDAP directory data.

3. The process of claim 1 in which implementing said change record at said replication site comprises:
   generating a database instruction that is specific to schema and data organizations at said second replication site.

4. The process of claim 3 further comprising:
   accessing metadata at said second replication site to generate said database instruction.

5. The process of claim 1 further comprising copying said change record to a first replication log at said first replication site, in which sending said change record to said second replication site comprises replicating said change record from said first replication log to a second replication log at said second replication site.

6. The process of claim 1 in which implementing said change record at said second replication site is performed using synchronous replication.

7. The process of claim 6 further comprising:
   adding said change record to a change log at said first replication site; and
   monitoring said change log for entry of new change records.

8. The process of claim 6 further comprising:
   adding said change record to a second change log at said second replication site; and
   monitoring said second change log for entry of new change records.

9. The process of claim 1 in which implementing said change record at said second replication site is performed using asynchronous replication.

10. The process of claim 9 in which said change record is sent to said second replication site in a periodic manner.

11. The process of claim 9 in which said change record is sent to said second replication site upon a trigger event.

12. The process of claim 1 in which schema and data organizations of said first replication site is different than that of said second replication site.

13. A process for replication of LDAP directory data in a distributed LDAP environment, comprising:
    receiving an LDAP operation request at a first LDAP server, said first LDAP server located at a first LDAP site;
    implementing said LDAP operation request to LDAP directory data at said first LDAP site;
    generating a change log entry to a change log, said change log entry independent of schema and data organizations at said first LDAP site, said change log entry corresponding to said LDAP operation request;
    replicating said change log entry to a second change log at a second LDAP site; and
    utilizing said change log entry at said second change log to implement said LDAP operation request at said second LDAP site.

14. The process of claim 13 in which said schema and data organizations of said first replication site is different than that of said second replication site.

15. The process of claim 13 in which implementing said LDAP operation request to said second LDAP site comprises:
    generating a database instruction that is specific to schema and data organizations at said second LDAP site.

16. The process of claim 15 further comprising:
    accessing metadata at said second LDAP site to generate said database instruction.

17. The process of claim 13 in which replicating said change log entry comprises:
    copying said change log entry from said change log to a first replication log at said first LDAP site; and
    replicating said change log entry from said first replication log at said first LDAP site to a second replication log at said second LDAP site.

18. The process of claim 13 in which said LDAP directory data is synchronously replicated.

19. The process of claim 14 further comprising:
    monitoring said change log for addition of said change log entry.

20. The process of claim 13 in which said LDAP directory data is asynchronously replicated.

21. The process of claim 20 in which said change log entry is replicated to said second LDAP site in a periodic manner.

22. The process of claim 20 in which said change log entry is sent to said second LDAP site upon a trigger event.

23. A computer program product that includes a medium usable by a processor, the medium having stored thereon a sequence of instructions which, when executed by said processor, causes said processor to execute a process for database replication, said process comprising:

receiving a change request to modify data at a first replication site;

implementing said change request at said first replication site;

generating a change record corresponding to said change request; said change record having a schema independent format;

sending said change record to a second replication site; and implementing said change record to a copy of said data at said second replication site.

24. A computer program product that includes a medium usable by a processor, the medium having stored thereon a sequence of instructions which, when executed by said processor, causes said processor to execute a process for replication of LDAP directory data in a distributed LDAP environment, said process comprising:

receiving an LDAP operation request at a first LDAP server, said first LDAP server located at a first LDAP site;

implementing said LDAP operation request to LDAP directory data at said first LDAP site;

generating a change log entry to a change log, said change log entry independent of schema and data organizations at said first LDAP site, said change log entry corresponding to said LDAP operation request;

replicating said change log entry to a second change log at a second LDAP site; and utilizing said change log entry at said second change log to implement said LDAP operation request at said second LDAP site.

25. A process for database replication comprising:

receiving a change request to modify data at a first replication site;

implementing the change request at the first replication site;

translating the change request into a schema independent change record;

sending the schema independent change record to a second replication site; and implementing the schema independent change record to a copy of the data at the second replication site.

26. The process of claim 25 wherein implementing the schema independent change record comprises issuing a change instruction that is specific to schema and data organization at the second replication site.

27. The process of claim 26 wherein implementing the schema independent change record further comprises accessing metadata at the second replication site to generate the change instruction.

28. The process of claim 25 further comprising copying the change record to a first replication log at the first replication site, wherein sending the schema independent change record to a second replication comprises replicating the schema independent change record from the first replication log to a second replication log at the second replication site.

29. The computer program product of claim 23, wherein said process further comprises:

copying said change record to a first replication log at said first replication site, in which sending said change record to said second replication site comprises replicating said change record from said first replication log to a second replication log at said second replication site.

30. The computer program product of claim 23, wherein implementing said change record at said second replication site is performed using synchronous replication.

31. The computer program of claim 30, wherein said process further comprises:

adding said change record to a change log at said first replication site; and monitoring said change log for entry of new change records.

32. The computer program product of claim 30, wherein said process further comprises:

adding said change record to a second change log at said second replication site; and monitoring said second change log for entry of new change records.

33. The compute program product of claim 24, wherein said schema and data organizations of said first replication site is different than that of said second replication site.

34. The computer program product of claim 24, wherein implementing said LDAP operation request to said second LDAP site comprises:

generating a database instruction that is specific to schema and data organizations at said second LDAP site.

35. The computer program product of claim 34, wherein said process further comprises:

accessing metadata at said second LDAP site to generate said database instruction.

36. The computer program product of claim 24, wherein replicating said change log entry comprises:

copying said change log entry from said change log to a first replication log at said first LDAP site; and replicating said change log entry from said first replication log at said first LDAP site to a second replication log at said second LDAP site.

37. The computer program product of claim 24, wherein said LDAP directory data is synchronously replicated.

38. The computer program product of claim 37, wherein said process further comprises:

monitoring said change log for addition of said change log entry.

* * * * *